(12) United States Patent
Watanabe et al.

(10) Patent No.: US 12,732,317 B2
(45) Date of Patent: Sep. 8, 2026

(54) COMMUNICATION APPARATUS, SYSTEM, AND METHOD

(71) Applicant: NEC Corporation, Tokyo (JP)

(72) Inventors: Shingo Watanabe, Tokyo (JP); Kenji Wakafuji, Tokyo (JP); Masakazu Ono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 341 days.

(21) Appl. No.: 18/526,336

(22) Filed: Dec. 1, 2023

(65) Prior Publication Data

US 2024/0187171 A1 Jun. 6, 2024

(30) Foreign Application Priority Data

Dec. 6, 2022 (JP) ................................ 2022-195185

(51) Int. Cl.
*H04L 5/00* (2006.01)
*H04W 72/0446* (2023.01)
*H04W 72/1268* (2023.01)

(52) U.S. Cl.
CPC ....... *H04L 5/0048* (2013.01); *H04W 72/0446* (2013.01); *H04W 72/1268* (2013.01)

(58) Field of Classification Search
CPC ............ H04L 5/0048; H04W 72/0446; H04W 72/1268; H04W 56/0055; H04B 7/18513
See application file for complete search history.

(56) References Cited

U.S. PATENT DOCUMENTS

2019/0007969 A1* 1/2019 Shako ................. H04W 74/006
2020/0404651 A1* 12/2020 Takeda .................. H04L 5/0094

FOREIGN PATENT DOCUMENTS

JP H07-253463 A 10/1995
JP 2021-022849 A 2/2021

OTHER PUBLICATIONS

Weicong Chen et al., "Angle-Dependent Phase Shifter Model for Reconfigurable Intelligent Surfaces: Does the Angle-Reciprocity Hold?", Article in IEEE Communications Letters, May 9, 2020.

* cited by examiner

*Primary Examiner* — Fred A Casca
(74) *Attorney, Agent, or Firm* — Sughrue Mion, PLLC

(57) ABSTRACT

A communication apparatus according to the present disclosure includes a receiver configured to receive upward data being transmitted from a terminal during an upward period from a terminal transmission start time to a terminal transmission end time in an upward slot, during an own apparatus reception period being equal in length to the upward period from an own apparatus reception start time being later than the terminal transmission start time by a propagation delay time; and a transmitter configured to transmit downward data during an own apparatus transmission period being equal in length to a downward period from an own apparatus transmission start time being earlier than a terminal reception start time by the propagation delay time, in such a way that the terminal receives the downward data during the downward period from the terminal reception start time to a terminal reception end time in a downward slot.

15 Claims, 8 Drawing Sheets

COMMUNICATION APPARATUS, SYSTEM, AND METHOD

INCORPORATION BY REFERENCE

This application is based upon and claims the benefit of priority from Japanese patent application No. 2022-195185, filed on Dec. 6, 2022, the disclosure of which is incorporated herein in its entirety by reference.

TECHNICAL FIELD

The present disclosure relates to a communication apparatus, a system, a method, and a program, and more particularly to a communication apparatus, a system, a method, and a program that are able to improve a throughput in a long-distance time division duplex (TDD) communication method.

BACKGROUND ART

As a mobile network of Beyond 5G, attention has been increasingly paid to a non-terrestrial network (NTN). Although a frequency division duplex (FDD) communication method has been dominant as ground-satellite communication of the NTN, it is expected that a TDD communication method is applied in the future. However, in a case where a TDD communication method which is provided with a guard time (GT) in consideration of a propagation delay time is applied to the ground-satellite communication, there is a problem that a ratio of occupation of the GT in one slot increases, and communication capacity (throughput) decreases.

In connection with the technology relating to the GT, paragraph of Patent Literature 1 describes that "The wireless communication system of the present example is configured in such a way that wireless communication is executed by using a wireless frame including a gap time between a time slot of a downward signal being transmitted from BS to MS and a time slot of an upward signal being transmitted from MS to BS, the MS measures a propagation delay time of the downward signal and notifies the BS of the propagation delay time, and the BS varies the time slot of the downward signal and the gap time, based on the propagation delay time of the downward signal notified from the MS." In addition, paragraph of Patent Literature 1 describes that "In the present example, such a configuration is adopted that a total time of the time slot of the downward signal and the gap time is fixed, double of the propagation delay time of the downward signal is set to be the gap time, and a time acquired by subtracting the gap time from the total time is set to be the time slot of the downward signal." Patent Literature 1 does not disclose a method for improving the throughput in a case where the propagation delay time becomes longer in the TDD communication method.

Patent Literature 2 discloses a cube-corner retroreflector for laser remote measurement that can correct a velocity aberration nondirectionally. Patent Literature 2 does not disclose a method for improving the throughput in a case where the propagation delay time becomes longer in the TDD communication method.

Patent Literature 1: Japanese Unexamined Patent Application Publication No. 2021-022849

Patent Literature 2: Japanese Unexamined Patent Application Publication No. H7-253463

Non Patent Literature 1: Weicong. Chen, Wei. Xiang. Jiang, Wankai. Tang, "Angle-Dependent Phase Shifter Model for Reconfigurable Intelligent Surfaces: Does the Angle-Reciprocity Hold?", Article in IEEE Communications Letters May 2020.

As described above, in a case where a TDD communication method that is provided with a guard time (GT) in consideration of a propagation delay time is applied to the ground-satellite communication, there is a problem that a ratio of occupation of the GT in one slot increases, and communication capacity (throughput) decreases.

An example object of the present disclosure is to provide a communication apparatus, a system, a method, and a program that solve the above-described problem.

SUMMARY

In a first example aspect of the present disclosure, a communication apparatus includes:

a receiver configured to receive upward data being transmitted from a terminal during an upward period from a terminal transmission start time to a terminal transmission end time in an upward slot, during an own apparatus reception period being equal in length to the upward period from an own apparatus reception start time being later than the terminal transmission start time by a propagation delay time; and a transmitter configured to transmit downward data during an own apparatus transmission period being equal in length to a downward period from an own apparatus transmission start time being earlier than a terminal reception start time by the propagation delay time, in such a way that the terminal receives the downward data during the downward period from the terminal reception start time to a terminal reception end time in a downward slot, wherein the propagation delay time is calculated based on a position of the terminal and a position of an own apparatus, a partial period of the own apparatus reception period and a partial period of the own apparatus transmission period overlap temporally, and a frequency of an upward carrier wave that carries the upward data and a frequency of a downward carrier wave that carries the downward data are identical.

In a second example aspect of the present disclosure, a system includes:

a communication apparatus; and a terminal configured to communicate with the communication apparatus, wherein the communication apparatus includes:

a receiver configured to receive upward data being transmitted from the terminal during an upward period from a terminal transmission start time to a terminal transmission end time in an upward slot, during an own apparatus reception period being equal in length to the upward period from an own apparatus reception start time being later than the terminal transmission start time by a propagation delay time; and a transmitter configured to transmit downward data during an own apparatus transmission period being equal in length to a downward period from an own apparatus transmission start time being earlier than a terminal reception start time by the propagation delay time, in such a way that the terminal receives the downward data during the downward period from the terminal reception start time to a terminal reception end time in a downward slot, the propagation delay time is calculated based on a position of the terminal and a position of an own apparatus, a partial period of the own apparatus reception period and a partial period of the own apparatus transmission period overlap temporally, a frequency of an upward carrier wave that carries the upward data and a frequency of a downward carrier wave that carries the downward data are identical, and the terminal includes:

a terminal transmitter configured to transmit the upward data during the upward period; and a terminal receiver configured to receive the downward data during the downward period.

In a third example aspect of the present disclosure, a method includes:

receiving upward data being transmitted from a terminal during an upward period from a terminal transmission start time to a terminal transmission end time in an upward slot, during an own apparatus reception period being equal in length to the upward period from an own apparatus reception start time being later than the terminal transmission start time by a propagation delay time; and transmitting downward data during an own apparatus transmission period being equal in length to a downward period from an own apparatus transmission start time being earlier than a terminal reception start time by the propagation delay time, in such a way that the terminal receives the downward data during the downward period from the terminal reception start time to a terminal reception end time in a downward slot, wherein the propagation delay time is calculated based on a position of the terminal and a position of an own apparatus, a partial period of the own apparatus reception period and a partial period of the own apparatus transmission period overlap temporally, and a frequency of an upward carrier wave that carries the upward data and a frequency of a downward carrier wave that carries the downward data are identical.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Hereinafter, example embodiments of the present disclosure are described with reference to the accompanying drawings. In each of the drawings, identical reference signs are given to identical or corresponding elements, and, for the clarification of description, overlapping descriptions are omitted unless otherwise necessary.

First Example Embodiment

<Communication Apparatus and System>

Figure 1:
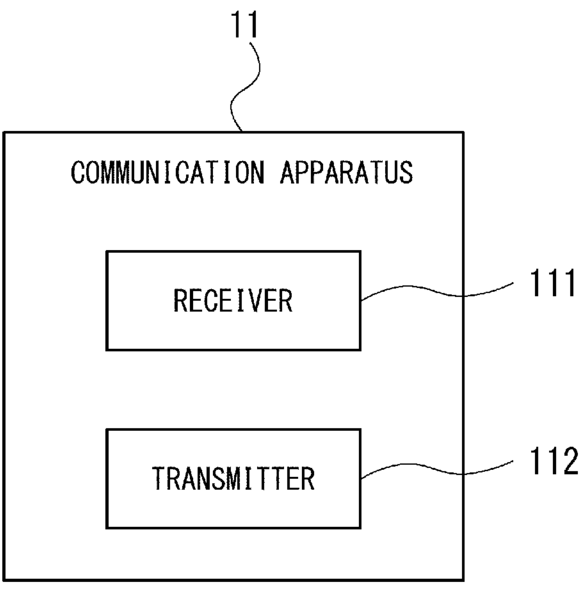
FIG. 1 is a block diagram exemplarily illustrating a communication apparatus according to a first example embodiment.

FIG. 1 is a block diagram exemplarily illustrating a communication apparatus according to a first example embodiment.

FIG. 1 illustrates a minimum configuration of the communication apparatus.

Figure 2:
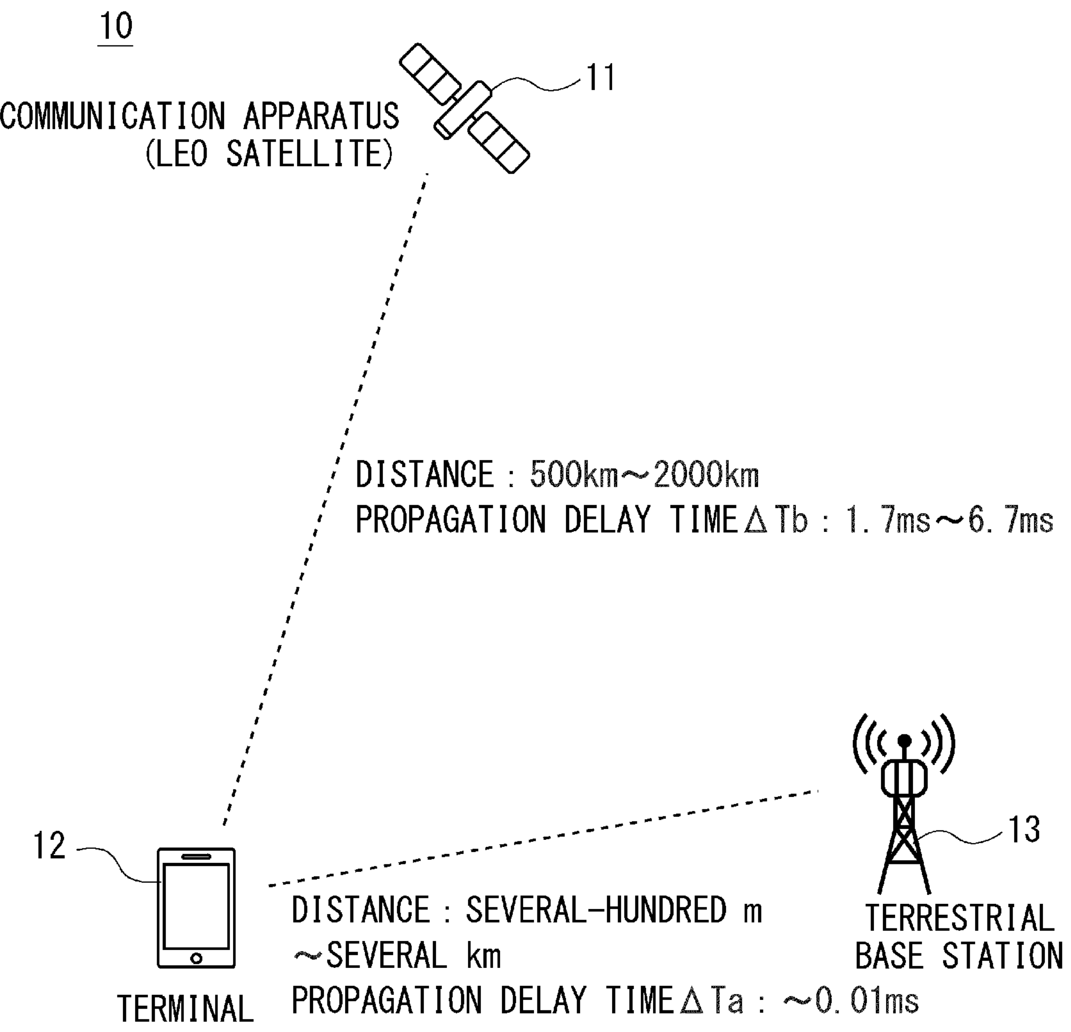
FIG. 2 is a block diagram exemplarily illustrating a system according to the first example embodiment.

FIG. 2 is a block diagram exemplarily illustrating a system according to the first example embodiment.

Figure 3:
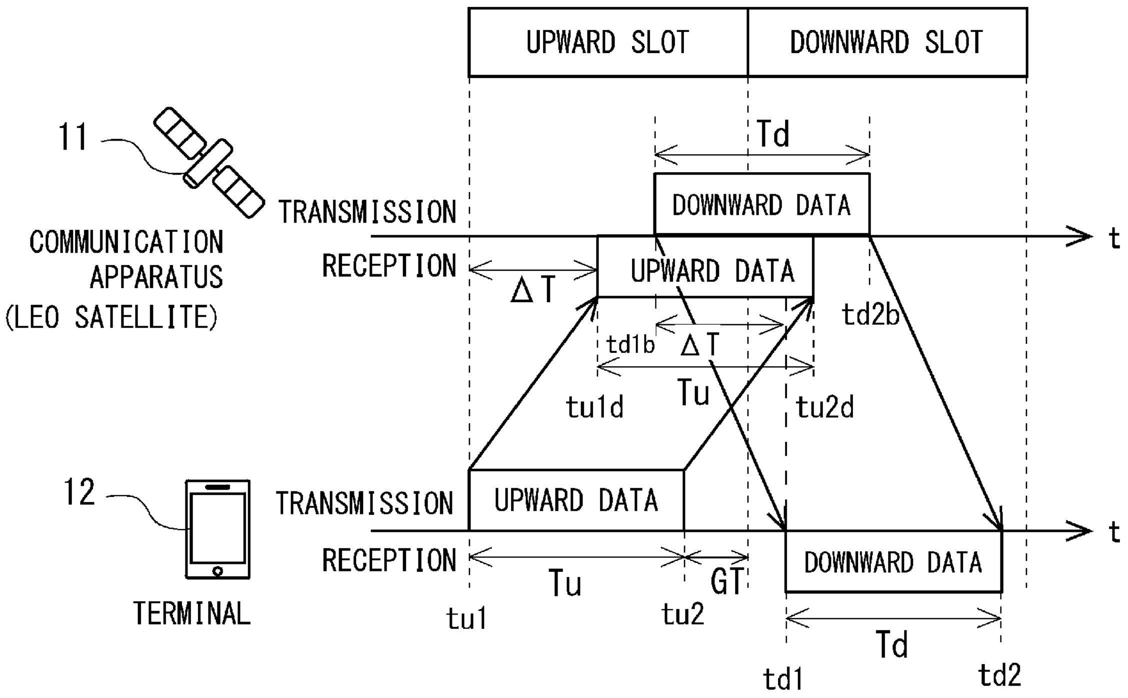
FIG. 3 is a diagram exemplarily illustrating time slots of a TDD communication method according to the first example embodiment.

FIG. 3 is a diagram exemplarily illustrating time slots of a TDD communication method according to the first example embodiment.

As illustrated in FIG. 1 and FIG. 2, a system 10 according to the first example embodiment includes a communication apparatus 11, a terminal 12 communicating with the communication apparatus 11, and a terrestrial base station 13 communicating with the terminal 12. The communication apparatus 11 includes a receiver 111 and a transmitter 112. In this example embodiment, the communication apparatus 11 is described by taking as an example a communication apparatus that is mounted on a low earth orbit (LEO) satellite, but is not limited to this.

The distance between the terminal 12 and the communication apparatus 11 is 500 km (kilometers) to 2000 km. A propagation delay time $\Delta Tb$ of radio waves between the terminal 12 and the communication apparatus 11 is 1.7 ms (milliseconds) to 6.7 ms. In addition, the distance between the terminal 12 and the terrestrial base station 13 is several-hundred m (meters) to several km. A propagation delay time $\Delta Ta$ of radio waves between the terminal 12 and the terrestrial base station 13 is about 0.01 ms at maximum. In this manner, since the distance between the terminal 12 and the communication apparatus 11 is longer than the distance between the terminal 12 and the terrestrial base station 13, the propagation delay time $\Delta T$ also becomes longer. Note that the direction of communication from the terminal 12 to the communication apparatus 11, or from the terminal 12 to the terrestrial base station 13, is called "upward", "upward link", or "up link (UP)". On the other hand, the direction of communication from the communication apparatus 11 to the terminal 12, or from the terrestrial base station 13 to the terminal 12, is called "downward", "downward link", or "down link (DP)".

As illustrated in FIG. 3, the terminal 12 transmits upward data during an upward period Tu from a terminal transmission start time tu1 to a terminal transmission end time tu2 in an upward slot. The receiver 111 of the communication apparatus 11 receives the upward data, which are transmitted from the terminal 12, during an own apparatus reception period Tu, which is equal in length to the upward period Tu, from an own apparatus reception start time tu1*d* that is later than the terminal transmission start time tu1 by a propagation delay time ΔT.

The terminal 12 receives downward data during a downward period Td from a terminal reception start time td1 to a terminal reception end time td2 in a downward slot. The transmitter 112 of the communication apparatus 11 transmits the downward data during an own apparatus transmission period Td, which is equal in length to the downward period Td, from an own apparatus transmission start time td1*b* that is earlier than the terminal reception start time td1 by the propagation delay time ΔT, in such a way that the terminal 12 receives the downward data during the downward period Td.

The communication apparatus 11 calculates the propagation delay time ΔT, for example, based on the position of the terminal 12 and the position of the communication apparatus 11. A partial period of the own apparatus reception period Tu and a partial period of the own apparatus transmission period Td overlap temporally. In addition, the frequency of an upward carrier wave that carries the upward data and the frequency of a downward carrier wave that carries the downward data are identical. In other words, the communication apparatus 11 executes communication by a TDD communication method.

The terminal 12 includes a terminal transmitter (not illustrated) that transmits upward data during the upward period Tu, and a terminal receiver (not illustrated) that receives downward data during the downward period Td. The terrestrial base station 13 executes mobile communication of 4G, 5G, or the like with the terminal 12.

Advantageous Effects

Figure 4:
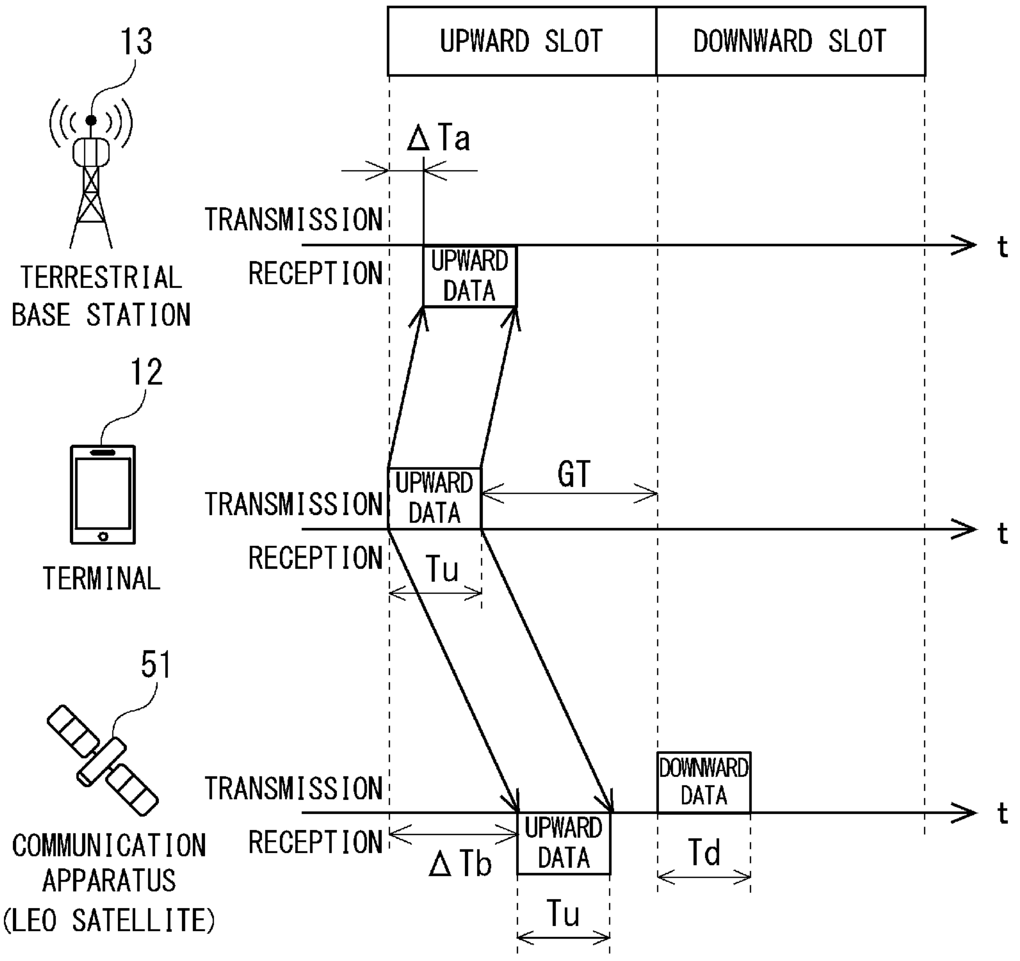
FIG. 4 is a diagram exemplarily illustrating time slots of a TDD communication method according to a comparative example of the first example embodiment.

FIG. 4 is a diagram exemplarily illustrating time slots of a TDD communication method according to a comparative example of the first example embodiment.

In FIG. 4, time slots between the terminal 12 and the terrestrial base station 13, and time slots between the terminal 12 and a communication apparatus 51 are illustrated.

The communication apparatus 51 is a communication apparatus according to a comparative example. The communication apparatus 51 differs from the communication apparatus 11 in that a partial period of the own apparatus reception period Tu and a partial period of the own apparatus transmission period Td do not overlap temporally.

As illustrated in FIG. 4, in the TDD communication method according to the comparative example, a guard time GT of a propagation delay time ΔTb at minimum is necessary in one time slot (for example, an upward slot). Since the propagation delay time ΔTb becomes longer as the distance of communication becomes longer, the guard time GT also becomes longer. Since the distance (see FIG. 2) between the terminal 12 and the communication apparatus 51 is long, the propagation delay time ΔTb is also long accordingly. If the propagation delay time ΔTb becomes longer, the guard time GT also becomes longer. If the guard time GT becomes longer, the time for transmitting and receiving data, i.e., the upward period Tu, becomes shorter, and thus the throughput decreases (the communication capacity decreases). The same applies to the downward link.

On the other hand, in the communication apparatus 11 according to the first example embodiment, as illustrated in FIG. 3, a partial period of the own apparatus reception period Tu and a partial period of the own apparatus transmission period Td overlap temporally. Thereby, the guard time GT of the propagation delay time or more is unnecessary, and the upward period Tu for transmitting upward data can be made longer. The same applies to the downward link.

As a result, according to the first example embodiment, there can be provided a communication apparatus, system, method, and program, which can improve a throughput in a long-distance TDD (Time Division Duplex) communication method. Note that the propagation delay time may also be referred to as a radio wave propagation delay time.

Note that in order to simultaneously execute the transmission operation and reception operation as illustrated in FIG. 3, the communication apparatus 11 needs to operate the transmitter 112 and receiver 111 independently. By independently operating the transmitter 112 and receiver 111, the communication apparatus 11 can execute an operation of receiving upward data from the terminal 12, while transmitting downward data to the terminal 12.

<Antenna>

Figure 5:
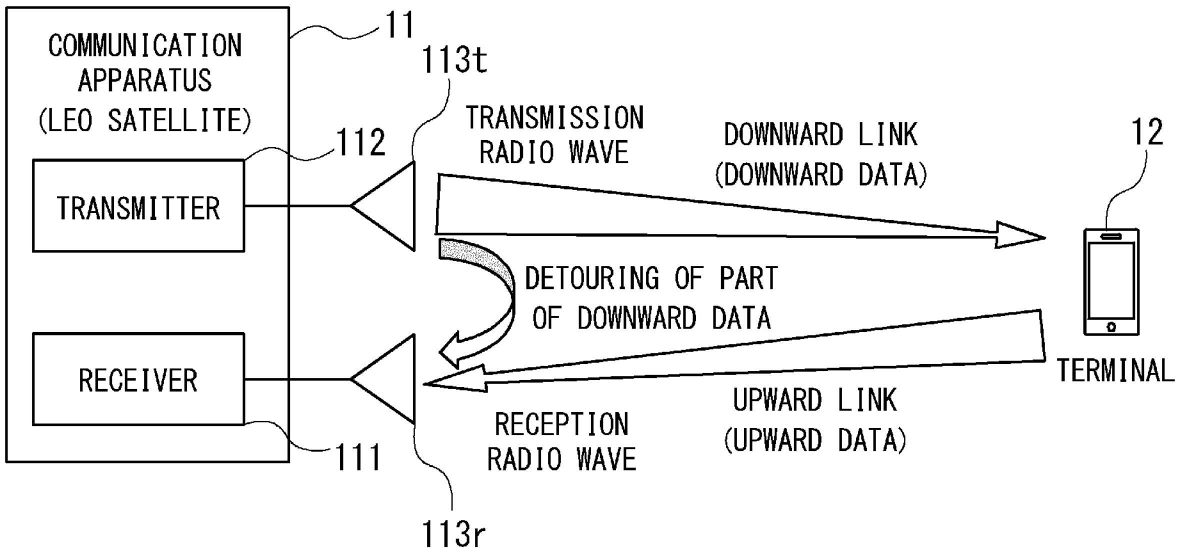
FIG. 5 is a block diagram exemplarily illustrating communication of the communication apparatus according to the first example embodiment.

FIG. 5 is a block diagram exemplarily illustrating communication of the communication apparatus according to the first example embodiment.

In the communication apparatus 11, in order to improve the throughput, a partial period of the own apparatus reception period Tu and a partial period of the own apparatus transmission period Td are made to overlap temporally (see FIG. 3). At this time, as illustrated in FIG. 5, since the communication apparatus 11 employs the TDD communication method, part of the downward data, which is output from a transmitting reflective antenna 113*t*, detours to a receiving reflective antenna 113*r*. In a case where a (reception) electric power of the detouring downward data at the receiving reflective antenna 113*r* is a predetermined electric power or more, the influence due to an interference with the upward data is great, and the throughput of the upward data is lowered.

Thus, the communication apparatus 11 uses a RIS (Reconfigurable Intelligent Surface) having a property of non-angular-reciprocity for a reflection mirror, and separates a path of transmission radio waves and a path of reception radio waves. Thereby, dual use for transmission and reception can be achieved by a single antenna including a single reflection mirror.

<RIS>

Figure 6:
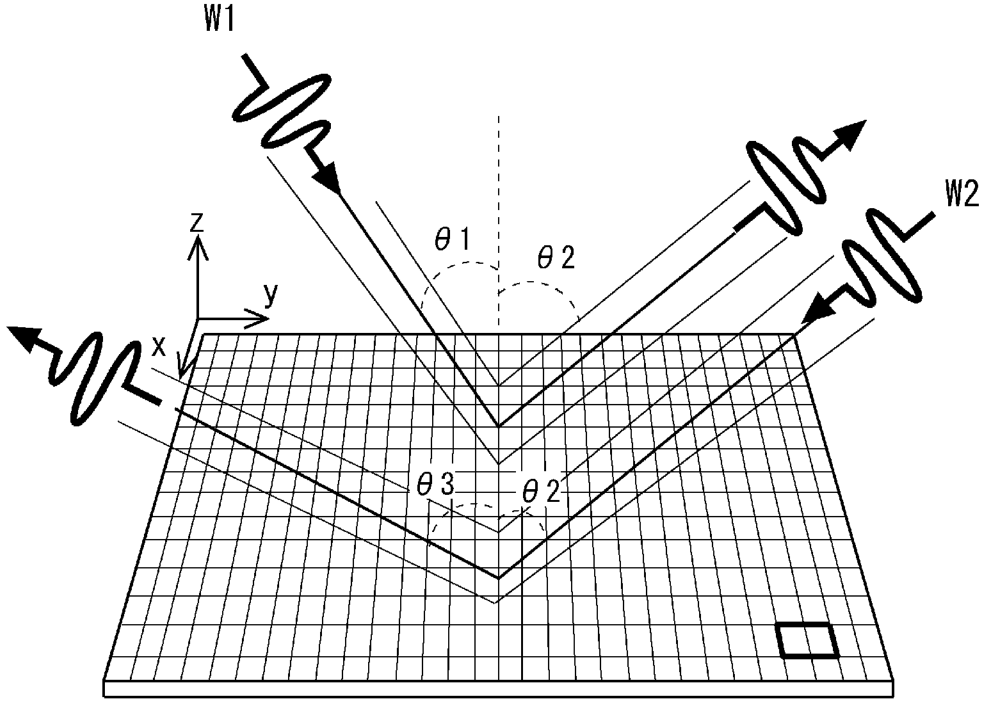
FIG. 6 is a schematic view exemplarily illustrating a RIS according to the first example embodiment.

FIG. 6 is a schematic view exemplarily illustrating a RIS according to the first example embodiment.

Figure 7:
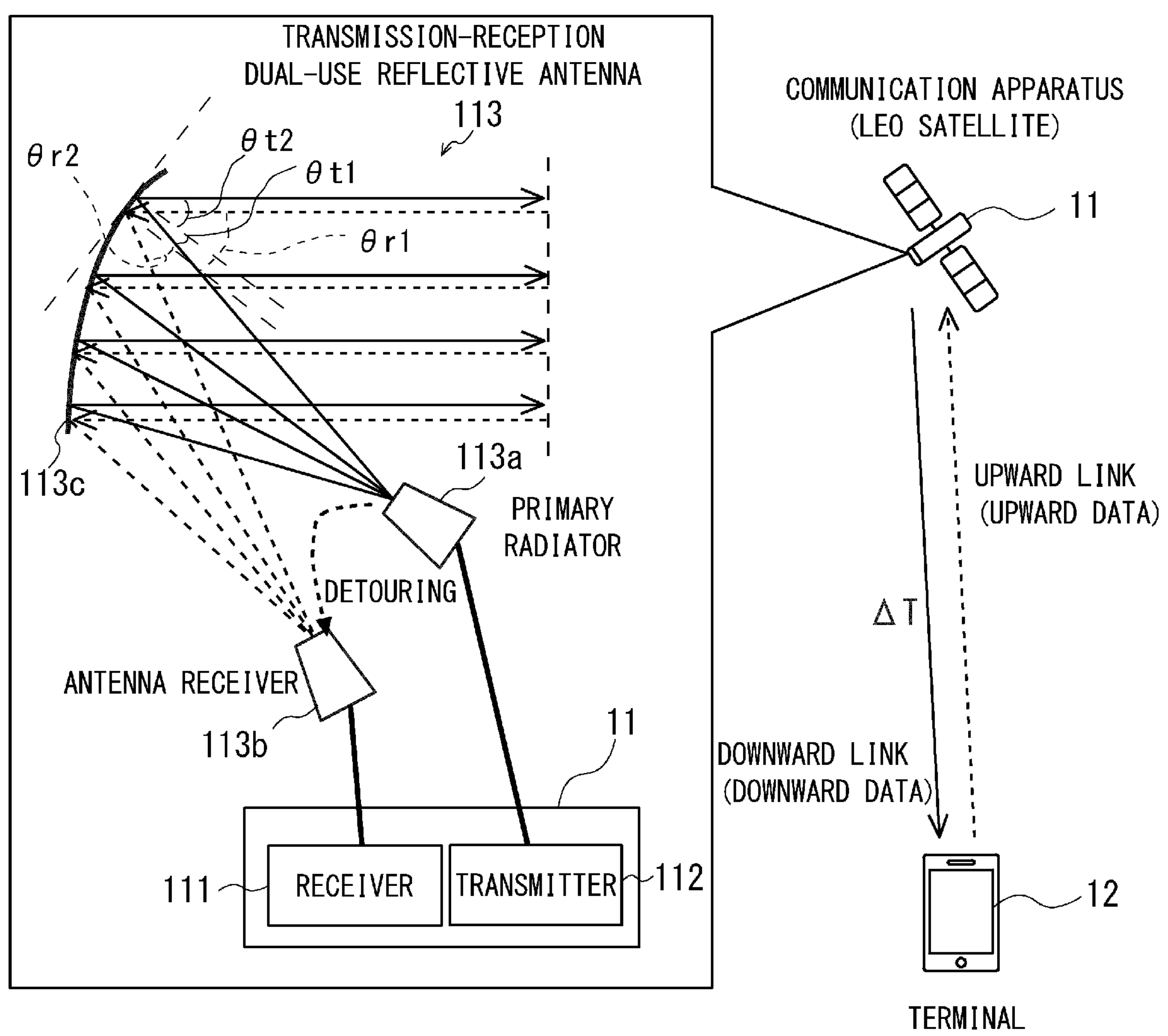
FIG. 7 is a block diagram exemplarily illustrating an antenna of the communication apparatus according to the first example embodiment.

FIG. 7 is a block diagram exemplarily illustrating an antenna of the communication apparatus according to the first example embodiment.

Note that since Non Patent Literature 1 describes the details of the RIS, the details of the operational principle, and the like, of the RIS are omitted here.

As illustrated in FIG. 6, the RIS is a reflection plate (reflection mirror), whose directivity at a time of reflection can be operated by electronic control. The RIS has such a property that the angular reciprocity of an incident wave and a reflected wave is not established. Specifically, a first radio wave W1 is incident at an incidence angle θ1 and is reflected at a reflection angle θ2. On the other hand, a second radio wave W2 is incident at an incidence angle θ2 and is reflected not at a reflection angle θ1, but at a reflection angle θ3. Making use of this property, the communication apparatus 11 separates a transmission radio wave (Down) and a reception radio wave (Up).

Specifically, as illustrated in FIG. 7, the communication apparatus 11 includes a transmission-reception dual-use reflective antenna 113 including a primary radiator 113*a*, an antenna receiver 113*b* and a reflection mirror 113*c*.

The primary radiator 113*a* is configured to make downward data, which are transmitted from the transmitter 112, incident on the reflection mirror 113*c* at a transmission incidence angle θt1. Note that the primary radiator, in some cases, is referred to as "horn antenna".

The reflection mirror 113*c* reflects the downward data, which are made incident at the transmission incidence angle θt1, at a transmission reflection angle θt2, and transmits the downward data to the terminal 12. On the other hand, the reflection mirror 113*c* reflects upward data, which are made incident at a reception incidence angle θr1 from the terminal 12, at a reception reflection angle θr2, and transmits the upward data to the antenna receiver 113*b*.

The antenna receiver 113*b* receives the upward data reflected at the reception reflection angle θr2, and transmits the upward data to the receiver 111. In addition, the antenna receiver 113*b* is disposed at such a position as to be less susceptible to the influence of a side lobe of the primary radiator 113*a*. The antenna receiver 113*b* is disposed, for example, at such a position that the directivity of the primary radiator 113*a* becomes null. Besides, the antenna receiver 113*b* may be disposed, for example, at such a position that a detouring electric power from the primary radiator 113*a* to the antenna receiver 113*b* becomes a predetermined electric power value or less.

At a reflection point of the reflection mirror 113*c* at which downward data are reflected and at which upward data are reflected, the transmission reflection angle θt2 and the reception incidence angle θr1 are identical, and the transmission incidence angle θt1 and the reception reflection angle θr2 are different. With the transmission incidence angle θt1 and the reception reflection angle θr2 being different, dual use of a single reflection mirror for transmission and reception is possible.

The transmission-reception dual-use reflective antenna 113 includes a RIS (Reconfigurable Intelligent Surface) that is the reflection mirror 113*c*, the RIS electrically controlling the transmission reflection angle θt2 and the reception reflection angle θr2. In other words, the transmission-reception dual-use reflective antenna 113 includes the RIS that is the reflection mirror capable of operating the directivity at a time of reflection by electronic control. By using the RIS, the transmission-reception dual-use reflective antenna 113 can constitute a reflection mirror with different paths for a transmission radio wave and a reception radio wave.

Note that a reflective surface of the reflection mirror 113*c* includes a planar surface or a curved surface, and reflects incident waves by this surface. In addition, the transmission-reception dual-use reflective antenna 113 is a planar antenna or a parabolic antenna.

Advantageous Effects

By using the RIS having the property of non-angular-reciprocity for a reflection mirror, the communication apparatus 11 can separate a path for a transmission radio wave and a path for a reception radio wave. Thereby, detouring of downward data toward upward data can be suppressed, a decrease in communication capacity can be suppressed, and a throughput can be improved.

In addition, by using the RIS, the communication apparatus 11 enables dual use of a single reflection mirror for transmission and reception, and therefore the reduction in cost and weight of the apparatus can be achieved.

Second Example Embodiment

Figure 8:
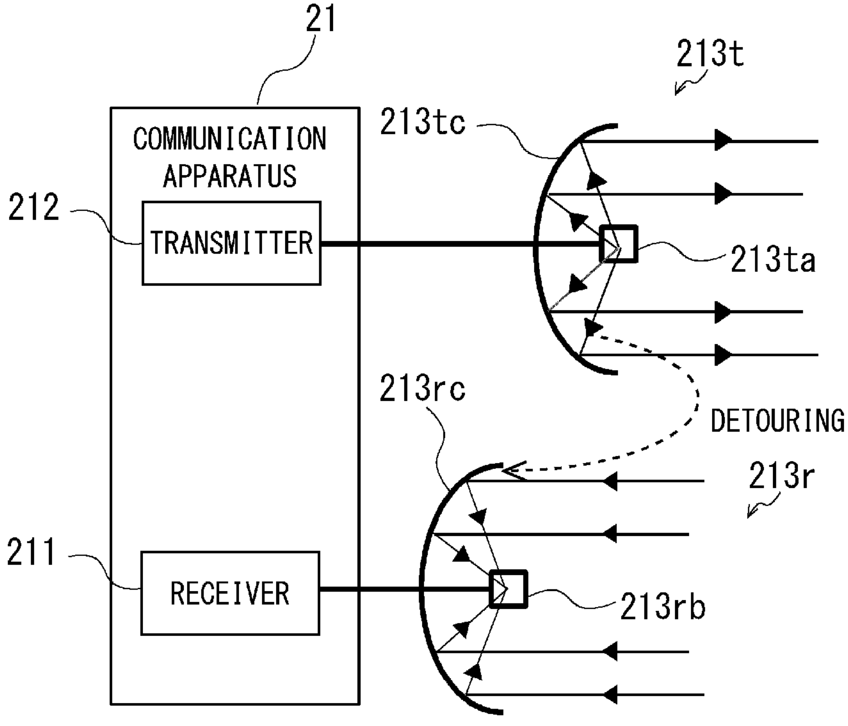
FIG. 8 is a block diagram exemplarily illustrating an antenna of a communication apparatus according to a second example embodiment.

FIG. 8 is a block diagram exemplarily illustrating a communication apparatus according to a second example embodiment.

A communication apparatus 21 according to the second example embodiment differs from the communication apparatus 11 according to the first example embodiment with respect to the configuration of the antenna.

As illustrated in FIG. 8, the communication apparatus 21 includes a transmitting reflective antenna 213*t* and a receiving reflective antenna 213*r*. The transmitting reflective antenna 213*t* includes a primary radiator 213*ta* and a transmitting reflection mirror 213*tc*. The receiving reflective antenna 213*r* includes an antenna receiver 213*rb* and a receiving reflection mirror 213*rc*.

Downward data, which are transmitted from a transmitter 212, is reflected by the transmitting reflection mirror 213*tc* via the primary radiator 213*ta*, and is transmitted to the terminal 12. Upward data, which are transmitted from the terminal 12, is reflected by the receiving reflection mirror 213*rc*, and is transmitted to a receiver 211 via the antenna receiver 213*rb*.

The transmitting reflection mirror 213*tc* and the receiving reflection mirror 213*rc* are disposed at such positions that a detouring electric power from the transmitting reflective antenna 213*t* to the receiving reflective antenna 213*r* becomes a predetermined electric power value or less.

The primary radiator 213*ta* is configured to make downward data, which are transmitted from the transmitter 212, incident on the transmitting reflection mirror 213*tc* at a transmission incidence angle. The transmitting reflection mirror 213*tc* reflects the downward data, which are made incident at the transmission incidence angle, at a transmission reflection angle, and transmits the downward data to the terminal 12. The receiving reflection mirror 213*rc* reflects upward data, which are made incident at a reception incidence angle from the terminal 12, at a reception reflection angle, and transmits the upward data to the antenna receiver 213*rb*. The antenna receiver 213*rb* receives the upward data, which are reflected at the reception reflection angle, and transmits the upward data to the receiver 211. The reception incidence angle at a reflection point of the receiving reflection mirror 213*rc*, at which the upward data are reflected, is identical to the transmission reflection angle at a reflection point of the transmitting reflection mirror 213*tc*, at which the downward data are reflected. The reception reflection angle at the reflection point of the receiving reflection mirror 213*rc* is identical to the transmission incidence angle at the reflection point of the transmitting reflection mirror 213*tc*. In addition, at the reflection point of the transmitting reflection mirror 213*tc*, at which the downward data are reflected, the transmission incidence angle is identical to the transmission reflection angle. Besides, at the reflection point of the receiving reflection mirror 213*rc*, at which the upward data are reflected, the reception incidence angle is identical to the reception reflection angle.

Note that a reflective surface of the transmitting reflection mirror 213*tc* includes a planar surface or a curved surface, and also a reflective surface of the receiving reflection mirror 213*rc* includes a planar surface or a curved surface. The transmitting reflective antenna 213*t* is a planar antenna or a parabolic antenna, and the receiving reflective antenna 213*r* is a planar antenna or a parabolic antenna.

<Features>

The features of the communication apparatus 21 according to the second example embodiment are described below.

Detouring of downward data is suppressed by installing a reflective mirror antenna with a sharp directivity for each of a transmission system and a reception system.

A detouring suppression effect of downward data can be increased by disposing the receiving reflective antenna 213*r*, for example, on the rear side (the left direction in FIG. 8) of the transmitting reflective antenna 213*t*.

In the above-described example embodiments, the present disclosure was described as a hardware configuration, but the present disclosure is not limited to this. The present disclosure can also be implemented by causing a CPU (Central Processing Unit) to execute a process of each constitutional element by executing a computer program.

In the above-described example embodiments, the program can be stored and provided to a computer using any type of non-transitory computer readable media. Non-transitory computer readable media include any type of tangible storage media. Examples of non-transitory computer readable media include magnetic storage media (specifically, floppy disks, magnetic tapes, hard disk drives, etc.), optical magnetic storage media (specifically, magneto-optical disks), CD-ROM (compact disc read only memory), CD-R (compact disc recordable), CD-R/W (compact disc rewritable), and semiconductor memories (specifically, mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Besides, although operations are described in a specific order, this should not be understood to require that such operations be executed in an indicated specific order or a successive order, or all illustrated operations be executed, in order to achieve a desired result. In a specific situation, there is a case where multitasking and parallel processing are advantageous. Similarly, although the details of some specific example embodiments are included in the above discussions, the details should be interpreted, not as limitations to the scope of the present disclosure, but as explanations of features unique to the specific example embodiments. Specific features described in the context of individual example embodiments may be implemented by being combined in a single example embodiment. Conversely, various features described in the context of a single example embodiment may be implemented separately, or in a freely selected appropriate combination, in a plurality of example embodiments.

The present disclosure has been described above by referring to the example embodiments, but the present disclosure is not limited to the above example embodiments. Various modifications, which are understandable by a skilled person within the scope of the present disclosure, can be made to the configurations and details of the present disclosure.

Note that the present disclosure is not limited to the above example embodiments, and can be modified as appropriate within the scope of the present disclosure.

According to the present disclosure, there can be provided a communication apparatus, system, method, and program, which can improve a throughput in a long-distance TDD (Time Division Duplex) communication method.

The first and second example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

The whole or part of the exemplary embodiments disclosed above can be described as, but not limited to, the following supplementary notes.

Supplementary Note 1

A communication apparatus including:

a receiver configured to receive upward data being transmitted from a terminal during an upward period from a terminal transmission start time to a terminal transmission end time in an upward slot, during an own apparatus reception period being equal in length to the upward period from an own apparatus reception start time that is later than the terminal transmission start time by a propagation delay time; and a transmitter configured to transmit downward data during an own apparatus transmission period being equal in length to a downward period, from an own apparatus transmission start time being earlier than a terminal reception start time by the propagation delay time, in such a way that the terminal receives the downward data during the downward period from the terminal reception start time to a terminal reception end time in a downward slot, wherein the propagation delay time is calculated based on a position of the terminal and a position of an own apparatus, a partial period of the own apparatus reception period and a partial period of the own apparatus transmission period overlap temporally, and a frequency of an upward carrier wave that carries the upward data and a frequency of a downward carrier wave that carries the downward data are identical.

Supplementary Note 2

The communication apparatus according to Supplementary note 1, further including a transmission-reception dual-use reflective antenna including a primary radiator, an antenna receiver, and a reflection mirror, wherein the primary radiator is configured to cause the downward data being transmitted from the transmitter to be incident on the reflection mirror at a transmission incidence angle, the reflection mirror is configured to reflect the downward data being incident at the transmission incidence angle, at a transmission reflection angle, transmit the downward data to the terminal, reflect the upward data being incident at a reception incidence angle from the terminal, at a reception reflection angle, and transmit the upward data to the antenna receiver, the antenna receiver is configured to receive the upward data reflected at the reception reflection angle, and transmit the upward data to the receiver, and, at a reflection point of the reflection mirror where the downward data are reflected and where the upward data are reflected, the transmission reflection angle and the reception incidence angle are identical, and the transmission incidence angle and the reception reflection angle are different.

Supplementary Note 3

The communication apparatus according to Supplementary note 2, wherein the transmission-reception dual-use reflective antenna includes a reconfigurable intelligent surface (RIS) that is the reflection mirror electrically controlling the transmission reflection angle and the reception reflection angle.

Supplementary Note 4

The communication apparatus according to Supplementary note 2, wherein a reflective surface of the reflection mirror includes a planar surface or a curved surface.

Supplementary Note 5

The communication apparatus according to Supplementary note 1, further including:

a transmitting reflective antenna including a primary radiator and a transmitting reflection mirror; and a receiving reflective antenna including an antenna receiver and a receiving reflection mirror, wherein the downward data being transmitted from the transmitter are reflected by the transmitting reflection mirror via the primary radiator, and are transmitted to the terminal, the upward data being transmitted from the terminal are reflected by the receiving reflection mirror, and are transmitted to the receiver via the antenna receiver, and the transmitting reflection mirror and the receiving reflection mirror are disposed at positions where detouring electric power from the transmitting reflective antenna to the receiving reflective antenna becomes a predetermined electric power value or less.

Supplementary Note 6

The communication apparatus according to Supplementary note 5, wherein the primary radiator is configured to cause the downward data being transmitted from the transmitter to be incident on the transmitting reflection mirror at a transmission incidence angle, the transmitting reflection mirror is configured to reflect the downward data being incident at the transmission incidence angle, at a transmission reflection angle, and transmit the downward data to the terminal, the receiving reflection mirror is configured to reflect the upward data being incident at a reception incidence angle from the terminal, at a reception reflection angle, and transmit the upward data to the antenna receiver, the antenna receiver is configured to receive the upward data being reflected at the reception reflection angle, and transmit the upward data to the receiver, the reception incidence angle at a reflection point of the receiving reflection mirror where the upward data are reflected is identical to the transmission reflection angle at a reflection point of the transmitting reflection mirror where the downward data are reflected, and the reception reflection angle at the reflection point of the receiving reflection mirror is identical to the transmission incidence angle at the reflection point of the transmitting reflection mirror.

Supplementary Note 7

A system including:

a communication apparatus; and a terminal configured to communicate with the communication apparatus, wherein the communication apparatus includes:

a receiver configured to receive upward data being transmitted from the terminal during an upward period from a terminal transmission start time to a terminal transmission end time in an upward slot, during an own apparatus reception period being equal in length to the upward period from an own apparatus reception start time being later than the terminal transmission start time by a propagation delay time; and a transmitter configured to transmit downward data during an own apparatus transmission period being equal in length to a downward period, from an own apparatus transmission start time being earlier than a terminal reception start time by the propagation delay time, in such a way that the terminal receives the downward data during the downward period from the terminal reception start time to a terminal reception end time in a downward slot, the propagation delay time is calculated based on a position of the terminal and a position of an own apparatus, a partial period of the own apparatus reception period and a partial period of the own apparatus transmission period overlap temporally, a frequency of an upward carrier wave that carries the upward data and a frequency of a downward carrier wave that carries the downward data are identical, and the terminal includes:

a terminal transmitter configured to transmit the upward data during the upward period; and a terminal receiver configured to receive the downward data during the downward period.

Supplementary Note 8

The system according to Supplementary note 7, further including a transmission-reception dual-use reflective antenna including a primary radiator, an antenna receiver and a reflection mirror, wherein the primary radiator is configured to cause the downward data being transmitted from the transmitter to be incident on the reflection mirror at a transmission incidence angle, the reflection mirror is configured to reflect the downward data being incident at the transmission incidence angle, at a transmission reflection angle, transmit the downward data to the terminal, reflect the upward data being made incident at a reception incidence angle from the terminal, at a reception reflection angle, and transmit the upward data to the antenna receiver, the antenna receiver is configured to receive the upward data reflected at the reception reflection angle, and transmit the upward data to the receiver, and at a reflection point of the reflection mirror where the downward data are reflected and where the upward data are reflected, the transmission reflection angle and the reception incidence angle are identical, and the transmission incidence angle and the reception reflection angle are different.

Supplementary Note 9

The system according to Supplementary note 8, wherein the transmission-reception dual-use reflective antenna includes a reconfigurable intelligent surface (RIS) that is the reflection mirror electrically controlling the transmission reflection angle and the reception reflection angle.

Supplementary Note 10

The system according to Supplementary note 8, wherein a reflective surface of the reflection mirror includes a planar surface or a curved surface.

Supplementary Note 11

The system according to Supplementary note 7, further including:

a transmitting reflective antenna including a primary radiator and a transmitting reflection mirror; and a receiving reflective antenna including an antenna receiver and a receiving reflection mirror, wherein the downward data being transmitted from the transmitter are reflected by the transmitting reflection mirror via the primary radiator, and are transmitted to the terminal, the upward data being transmitted from the terminal, are reflected by the receiving reflection mirror, and are transmitted to the receiver via the antenna receiver, and the transmitting reflection mirror and the receiving reflection mirror are disposed at positions where a detouring electric power from the transmitting reflective antenna to the receiving reflective antenna becomes a predetermined electric power value or less.

Supplementary Note 12

The system according to Supplementary note 11, wherein the primary radiator is configured to cause the downward data being transmitted from the transmitter to be incident on the transmitting reflection mirror at a transmission incidence angle, the transmitting reflection mirror is configured to reflect the downward data being incident at the transmission incidence angle, at a transmission reflection angle, and transmit the downward data to the terminal, the receiving reflection mirror is configured to reflect the upward data being incident at a reception incidence angle from the terminal, at a reception reflection angle, and transmit the upward data to the antenna receiver, the antenna receiver is configured to receive the upward data being reflected at the reception reflection angle, and transmit the upward data to the receiver, the reception incidence angle at a reflection point of the receiving reflection mirror where the upward data are reflected is identical to the transmission reflection angle at a reflection point of the transmitting reflection mirror where the downward data are reflected, and the reception reflection angle at the reflection point of the receiving reflection mirror is identical to the transmission incidence angle at the reflection point of the transmitting reflection mirror.

Supplementary Note 13

A method including:

receiving upward data being transmitted from a terminal during an upward period from a terminal transmission start time to a terminal transmission end time in an upward slot, during an own apparatus reception period being equal in length to the upward period, from an own apparatus reception start time being later than the terminal transmission start time by a propagation delay time; and transmitting downward data during an own apparatus transmission period being equal in length to a downward period, from an own apparatus transmission start time being earlier than a terminal reception start time by the propagation delay time, in such a way that the terminal receives the downward data during the downward period from the terminal reception start time to a terminal reception end time in a downward slot, wherein the propagation delay time is calculated based on a position of the terminal and a position of an own apparatus, a partial period of the own apparatus reception period and a partial period of the own apparatus transmission period overlap temporally, and a frequency of an upward carrier wave that carries the upward data and a frequency of a downward carrier wave that carries the downward data are identical.

Supplementary Note 14

The method according to Supplementary note 13, wherein a communication apparatus includes a transmitter and a receiver, and further includes a transmission-reception dual-use reflective antenna including a primary radiator, an antenna receiver and a reflection mirror, the downward data being transmitted from the transmitter are incident on the primary radiator of the reflection mirror at a transmission incidence angle, the reflection mirror is configured to reflect the downward data being incident at the transmission incidence angle, at a transmission reflection angle, transmit the downward data to the terminal, reflect the upward data being incident at a reception incidence angle from the terminal, at a reception reflection angle, and transmit the upward data to the antenna receiver, the antenna receiver is configured to receive the upward data reflected at the reception reflection angle, and transmit the upward data to the receiver, and, at a reflection point of the reflection mirror where the downward data are reflected and where the upward data are reflected, the transmission reflection angle and the reception incidence angle are identical, and the transmission incidence angle and the reception reflection angle are different.

Supplementary Note 15

The method according to Supplementary note 14, wherein the transmission-reception dual-use reflective antenna includes a reconfigurable intelligent surface (RIS) that is the reflection mirror electrically controlling the transmission reflection angle and the reception reflection angle.

Supplementary Note 16

The method according to Supplementary note 14, wherein a reflective surface of the reflection mirror includes a planar surface or a curved surface.

Supplementary Note 17

The method according to Supplementary note 13, wherein a communication apparatus includes a transmitter and a receiver, the communication apparatus further includes a transmitting reflective antenna including a primary radiator and a transmitting reflection mirror, and a receiving reflective antenna including an antenna receiver and a receiving reflection mirror, the downward data being transmitted from the transmitter are reflected by the transmitting reflection mirror via the primary radiator, and are transmitted to the terminal, the upward data being transmitted from the terminal are reflected by the receiving reflection mirror, and are transmitted to the receiver via the antenna receiver, and the transmitting reflection mirror and the receiving reflection mirror are disposed at positions where a detouring electric power from the transmitting reflective antenna to the receiving reflective antenna becomes a predetermined electric power value or less.

Supplementary Note 18

The method according to Supplementary note 17, wherein the primary radiator is configured to cause the downward data being transmitted from the transmitter to be incident on the transmitting reflection mirror at a transmission incidence angle, the transmitting reflection mirror is configured to reflect the downward data being incident at the transmission incidence angle, at a transmission reflection angle, and transmit the downward data to the terminal, the receiving reflection mirror is configured to reflect the upward data being incident at a reception incidence angle from the terminal, at a reception reflection angle, and transmit the upward data to the antenna receiver, the antenna receiver is configured to receive the upward data being reflected at the reception reflection angle, and transmit the upward data to the receiver, the reception incidence angle at a reflection point of the receiving reflection mirror where the upward data are reflected, is identical to the transmission reflection angle at a reflection point of the transmitting reflection mirror where the downward data are reflected, and the reception reflection angle at the reflection point of the receiving reflection mirror is identical to the transmission incidence angle at the reflection point of the transmitting reflection mirror.

What is claimed is:

1. A communication apparatus comprising:

a receiver configured to receive upward data being transmitted from a terminal during an upward period from a terminal transmission start time to a terminal transmission end time in an upward slot, during an own apparatus reception period being equal in length to the upward period from an own apparatus reception start time being later than the terminal transmission start time by a propagation delay time; and a transmitter configured to transmit downward data during an own apparatus transmission period being equal in length to a downward period from an own apparatus transmission start time being earlier than a terminal reception start time by the propagation delay time, in such a way that the terminal receives the downward data during the downward period from the terminal reception start time to a terminal reception end time in a downward slot, wherein the propagation delay time is calculated based on a position of the terminal and a position of an own apparatus, a partial period of the own apparatus reception period and a partial period of the own apparatus transmission period overlap temporally, and a frequency of an upward carrier wave that carries the upward data and a frequency of a downward carrier wave that carries the downward data are identical, the communication apparatus further comprising a transmission-reception dual-use reflective antenna including a primary radiator, an antenna receiver, and a reflection mirror, wherein the primary radiator is configured to cause the downward data being transmitted from the transmitter to be incident on the reflection mirror at a transmission incidence angle, the reflection mirror is configured to reflect the downward data being incident at the transmission incidence angle, at a transmission reflection angle, transmit the downward data to the terminal, reflect the upward data being incident at a reception incidence angle from the terminal, at a reception reflection angle, and transmit the upward data to the antenna receiver, the antenna receiver is configured to receive the upward data reflected at the reception reflection angle, and transmit the upward data to the receiver, and, at a reflection point of the reflection mirror where the downward data are reflected and where the upward data are reflected, the transmission reflection angle and the reception incidence angle are identical, and the transmission incidence angle and the reception reflection angle are different.

2. The communication apparatus according to claim 1, wherein the transmission-reception dual-use reflective antenna comprises a reconfigurable intelligent surface (RIS) that is the reflection mirror electrically controlling the transmission reflection angle and the reception reflection angle.

3. The communication apparatus according to claim 1, wherein a reflective surface of the reflection mirror comprises a planar surface or a curved surface.

4. A communication apparatus comprising:

a receiver configured to receive upward data being transmitted from a terminal during an upward period from a terminal transmission start time to a terminal transmission end time in an upward slot, during an own apparatus reception period being equal in length to the upward period from an own apparatus reception start time being later than the terminal transmission start time by a propagation delay time; and a transmitter configured to transmit downward data during an own apparatus transmission period being equal in length to a downward period from an own apparatus transmission start time being earlier than a terminal reception start time by the propagation delay time, in such a way that the terminal receives the downward data during the downward period from the terminal reception start time to a terminal reception end time in a downward slot, wherein the propagation delay time is calculated based on a position of the terminal and a position of an own apparatus, a partial period of the own apparatus reception period and a partial period of the own apparatus transmission period overlap temporally, and a frequency of an upward carrier wave that carries the upward data and a frequency of a downward carrier wave that carries the downward data are identical, the communication apparatus further comprising:

a transmitting reflective antenna comprising a primary radiator and a transmitting reflection mirror; and a receiving reflective antenna comprising an antenna receiver and a receiving reflection mirror, wherein the downward data being transmitted from the transmitter are reflected by the transmitting reflection mirror via the primary radiator, and are transmitted to the terminal, the upward data being transmitted from the terminal are reflected by the receiving reflection mirror, and are transmitted to the receiver via the antenna receiver, and the transmitting reflection mirror and the receiving reflection mirror are disposed at positions where detouring electric power from the transmitting reflective antenna to the receiving reflective antenna becomes a predetermined electric power value or less.

5. The communication apparatus according to claim 4, wherein the primary radiator is configured to cause the downward data being transmitted from the transmitter to be incident on the transmitting reflection mirror at a transmission incidence angle, the transmitting reflection mirror is configured to reflect the downward data being incident at the transmission incidence angle, at a transmission reflection angle, and transmit the downward data to the terminal, the receiving reflection mirror is configured to reflect the upward data being incident at a reception incidence angle from the terminal, at a reception reflection angle, and transmit the upward data to the antenna receiver, the antenna receiver is configured to receive the upward data being reflected at the reception reflection angle, and transmit the upward data to the receiver, the reception incidence angle at a reflection point of the receiving reflection mirror where the upward data are reflected is identical to the transmission reflection angle at a reflection point of the transmitting reflection mirror where the downward data are reflected, and the reception reflection angle at the reflection point of the receiving reflection mirror is identical to the transmission incidence angle at the reflection point of the transmitting reflection mirror.

6. A system comprising:

a communication apparatus; and a terminal configured to communicate with the communication apparatus, wherein the communication apparatus comprises:

a receiver configured to receive upward data being transmitted from the terminal during an upward period from a terminal transmission start time to a terminal transmission end time in an upward slot, during an own apparatus reception period being equal in length to the upward period from an own apparatus reception start time being later than the terminal transmission start time by a propagation delay time; and a transmitter configured to transmit downward data during an own apparatus transmission period being equal in length to a downward period from an own apparatus transmission start time being earlier than a terminal reception start time by the propagation delay time, in such a way that the terminal receives the downward data during the downward period from the terminal reception start time to a terminal reception end time in a downward slot, wherein the propagation delay time is calculated based on a position of the terminal and a position of an own apparatus, a partial period of the own apparatus reception period and a partial period of the own apparatus transmission period overlap temporally, and a frequency of an upward carrier wave that carries the upward data and a frequency of a downward carrier wave that carries the downward data are identical, the system further comprising a transmission-reception dual-use reflective antenna including a primary radiator, an antenna receiver and a reflection mirror, wherein the primary radiator is configured to cause the downward data being transmitted from the transmitter to be incident on the reflection mirror at a transmission incidence angle, the reflection mirror is configured to reflect the downward data being incident at the transmission incidence angle, at a transmission reflection angle, transmit the downward data to the terminal, reflect the upward data being incident at a reception incidence angle from the terminal, at a reception reflection angle, and transmit the upward data to the antenna receiver, the antenna receiver is configured to receive the upward data reflected at the reception reflection angle, and transmit the upward data to the receiver, and, at a reflection point of the reflection mirror where the downward data are reflected and where the upward data are reflected, the transmission reflection angle and the reception incidence angle are identical, and the transmission incidence angle and the reception reflection angle are different, and the terminal comprises:

a terminal transmitter configured to transmit the upward data during the upward period; and a terminal receiver configured to receive the downward data during the downward period.

7. The system according to claim 6, wherein the transmission-reception dual-use reflective antenna includes a reconfigurable intelligent surface (RIS) that is the reflection mirror electrically controlling the transmission reflection angle and the reception reflection angle.

8. The system according to claim 6, wherein a reflective surface of the reflection mirror comprises a planar surface or a curved surface.

9. A system comprising:

a communication apparatus; and a terminal configured to communicate with the communication apparatus, wherein the communication apparatus comprises:

a receiver configured to receive upward data being transmitted from the terminal during an upward period from a terminal transmission start time to a terminal transmission end time in an upward slot, during an own apparatus reception period being equal in length to the upward period from an own apparatus reception start time being later than the terminal transmission start time by a propagation delay time; and a transmitter configured to transmit downward data during an own apparatus transmission period being equal in length to a downward period from an own apparatus transmission start time being earlier than a terminal reception start time by the propagation delay time, in such a way that the terminal receives the downward data during the downward period from the terminal reception start time to a terminal reception end time in a downward slot, wherein the propagation delay time is calculated based on a position of the terminal and a position of an own apparatus, a partial period of the own apparatus reception period and a partial period of the own apparatus transmission period overlap temporally, and a frequency of an upward carrier wave that carries the upward data and a frequency of a downward carrier wave that carries the downward data are identical, the system further comprising a transmitting reflective antenna including a primary radiator and a transmitting reflection mirror; and a receiving reflective antenna comprising an antenna receiver and a receiving reflection mirror, wherein the downward data being transmitted from the transmitter are reflected by the transmitting reflection mirror via the primary radiator, and are transmitted to the terminal, the upward data being transmitted from the terminal are reflected by the receiving reflection mirror, and are transmitted to the receiver via the antenna receiver, and the transmitting reflection mirror and the receiving reflection mirror are disposed at positions where detouring electric power from the transmitting reflective antenna to the receiving reflective antenna becomes a predetermined electric power value or less, and the terminal comprises:

a terminal transmitter configured to transmit the upward data during the upward period; and a terminal receiver configured to receive the downward data during the downward period.

10. The system according to claim 9, wherein the primary radiator is configured to cause the downward data being transmitted from the transmitter to be incident on the transmitting reflection mirror at a transmission incidence angle, the transmitting reflection mirror is configured to reflect the downward data being incident at the transmission incidence angle, at a transmission reflection angle, and transmit the downward data to the terminal, the receiving reflection mirror is configured to reflect the upward data being incident at a reception incidence angle from the terminal, at a reception reflection angle, and transmit the upward data to the antenna receiver, the antenna receiver is configured to receive the upward data being reflected at the reception reflection angle, and transmit the upward data to the receiver, the reception incidence angle at a reflection point of the receiving reflection mirror where the upward data are reflected is identical to the transmission reflection angle at a reflection point of the transmitting reflection mirror where the downward data are reflected, and the reception reflection angle at the reflection point of the receiving reflection mirror is identical to the transmission incidence angle at the reflection point of the transmitting reflection mirror.

11. A method comprising:

receiving upward data being transmitted from a terminal during an upward period from a terminal transmission start time to a terminal transmission end time in an upward slot, during an own apparatus reception period being equal in length to the upward period from an own apparatus reception start time being later than the terminal transmission start time by a propagation delay time; and transmitting downward data during an own apparatus transmission period being equal in length to a downward period from an own apparatus transmission start time being earlier than a terminal reception start time by the propagation delay time, in such a way that the terminal receives the downward data during the downward period from the terminal reception start time to a terminal reception end time in a downward slot, wherein the propagation delay time is calculated based on a position of the terminal and a position of an own apparatus, a partial period of the own apparatus reception period and a partial period of the own apparatus transmission period overlap temporally, and a frequency of an upward carrier wave that carries the upward data and a frequency of a downward carrier wave that carries the downward data are identical, wherein a communication apparatus comprises a transmitter and a receiver, and further comprises a transmission-reception dual-use reflective antenna including a primary radiator, an antenna receiver, and a reflection mirror, the downward data being transmitted from the transmitter are incident on the primary radiator of the reflection mirror at a transmission incidence angle, the reflection mirror is configured to reflect the downward data being incident at the transmission incidence angle, at a transmission reflection angle, transmit the downward data to the terminal, reflect the upward data being incident at a reception incidence angle from the terminal, at a reception reflection angle, and transmit the upward data to the antenna receiver, the antenna receiver is configured to receive the upward data reflected at the reception reflection angle, and transmit the upward data to the receiver, and, at a reflection point of the reflection mirror where the downward data are reflected and where the upward data are reflected, the transmission reflection angle and the reception incidence angle are identical, and the transmission incidence angle and the reception reflection angle are different.

12. The method according to claim 11, wherein the transmission-reception dual-use reflective antenna includes a reconfigurable intelligent surface (RIS) that is the reflection mirror electrically controlling the transmission reflection angle and the reception reflection angle.

13. The method according to claim 11, wherein a reflective surface of the reflection mirror includes a planar surface or a curved surface.

14. A method comprising:

receiving upward data being transmitted from a terminal during an upward period from a terminal transmission start time to a terminal transmission end time in an upward slot, during an own apparatus reception period being equal in length to the upward period from an own apparatus reception start time being later than the terminal transmission start time by a propagation delay time; and transmitting downward data during an own apparatus transmission period being equal in length to a downward period from an own apparatus transmission start time being earlier than a terminal reception start time by the propagation delay time, in such a way that the terminal receives the downward data during the downward period from the terminal reception start time to a terminal reception end time in a downward slot, wherein the propagation delay time is calculated based on a position of the terminal and a position of an own apparatus, a partial period of the own apparatus reception period and a partial period of the own apparatus transmission period overlap temporally, and a frequency of an upward carrier wave that carries the upward data and a frequency of a downward carrier wave that carries the downward data are identical, wherein a communication apparatus comprises a transmitter and a receiver, the communication apparatus further comprises a transmitting reflective antenna including a primary radiator and a transmitting reflection mirror, and a receiving reflective antenna including an antenna receiver and a receiving reflection mirror, the downward data being transmitted from the transmitter are reflected by the transmitting reflection mirror via the primary radiator, and are transmitted to the terminal, the upward data being transmitted from the terminal are reflected by the receiving reflection mirror, and are transmitted to the receiver via the antenna receiver, and the transmitting reflection mirror and the receiving reflection mirror are disposed at positions where detouring electric power from the transmitting reflective antenna to the receiving reflective antenna becomes a predetermined electric power value or less.

15. The method according to claim 14, wherein the primary radiator is configured to cause the downward data being transmitted from the transmitter to be incident on the transmitting reflection mirror at a transmission incidence angle, the transmitting reflection mirror is configured to reflect the downward data being incident at the transmission incidence angle, at a transmission reflection angle, and transmit the downward data to the terminal, the receiving reflection mirror is configured to reflect the upward data being incident at a reception incidence angle from the terminal, at a reception reflection angle, and transmit the upward data to the antenna receiver, the antenna receiver is configured to receive the upward data being reflected at the reception reflection angle, and transmit the upward data to the receiver, the reception incidence angle at a reflection point of the receiving reflection mirror where the upward data are reflected is identical to the transmission reflection angle at a reflection point of the transmitting reflection mirror where the downward data are reflected, and the reception reflection angle at the reflection point of the receiving reflection mirror is identical to the transmission incidence angle at the reflection point of the transmitting reflection mirror.

* * * * *